United States Patent Office 3,420,639
Patented Jan. 7, 1969

2,420,639
MOLTEN SALT METHOD OF SEPARATION OF AMERICIUM FROM PLUTONIUM
Lawrence J. Mullins and Joseph A. Leary, Los Alamos, N. Mex., assignors to the United States of America as represented by the United States Atomic Energy Commission
No Drawing. Filed Oct. 20, 1967, Ser. No. 677,504
U.S. Cl. 23—325  2 Claims
Int. Cl. C01g 56/00

ABSTRACT OF THE DISCLOSURE

Americium values are separated from an americium-plutonium value mixture by dissolving this mixture in a molten salt solution. A combination of gaseous oxygen and argon is then introduced into the loaded melt to precipitate the plutonium as the dioxide, leaving the americium values in solution.

---

The invention described herein was made in the course of, or under, a contract with the U.S. Atomic Energy Commission.

The economic value of both plutonium and americium makes it necessary that these elements be recovered and separated. The process disclosed herein permits the recovery and separation by precipitating the plutonium as plutonium dioxide while the americium remains in the molten salt solution. The inventors are incorporating as a reference U.S. Patent No. 3,098,028, in which they are also the inventors. This patent discloses an electrorefining process for the recovery of plutonium that is contained in a molten salt solution. The inventors have discovered that plutonium dioxide is precipitated from the molten salt solution at 700° C. by introducing a mixture of oxygen and argon gas into the salt solution and that this separation can be controlled by adjusting the volume of oxygen gas passed through the salt and also by the time the gas is passed.

It is, therefore, an object of this invention to provide a method of separating americium from plutonium that is contained in a molten salt solution.

Other objects of this invention will become more apparent from the following description of the preferred embodiment.

In a typical experiment 62 grams of electrolyte from an electrorefining cell is melted in a quartz tube and heated to 700° C. The electrolyte is of the usual electrorefining composition, containing equimolar amounts of sodium and potassium chloride, 7.73 weight percent plutonium, and 0.0582 weight percent americium. After a gas mixture of oxygen and argon (100 ml. oxygen per minute and 1660 ml. of argon per minute) is bubbled through the molten salt for 1.5 hr., 99.7% of the plutonium and 8.0% of the americium are precipitated and settled to the bottom of the quartz tube. A sample of the supernatant solution is collected by filtering the molten salt through a fine porosity quartz frit. The melt is cooled to room temperature and examination of the solidified melt shows an excellent physical separation of the white supernatant salt and the green plutonium dioxide. The results of this experiment are summarized in Table I.

The inventors have discovered that the americium-plutonium separation can be controlled by adjusting the volume of oxygen gas passed through the melt. Thus, alternatively, the americium can be precipitated with the plutonium. Results which demonstrate this separation are given in Table II.

Table I.—Summary of $PuO_2$ precipitation experiment

| | |
|---|---|
| Temperature | 700° C. |
| Flow rates | 100 ml. $O_2$/min., 1660 ml. Ar/min. |
| Time of gas bubbling | 1.5 hr. |
| Wt. of (NaCl-KCl-$PuF_3$) feed | 62.1 g. |
| Feed concentrations | {7.73 wt. percent Pu. {0.0582 wt. percent Am. |
| Filtrate concentrations | {0.00304 wt. percent Pu. {0.0602 wt. percent Am. |
| Fraction of Pu precipitated | 0.997. |
| Fraction of Am precipitated | 0.081. |
| Ratio of Am/Pu: | |
| Feed | 0.00753. |
| Filtrate | 19.8. |

Table II.—Separation of americium and plutonium as a function of time

| | |
|---|---|
| Temperature | 700° C. |
| Flow ratio | 100 ml. $O_2$/min., 1660 ml. Ar/min. |
| Wt. of (NaCl-KCl-$PuF_3$) | 63.4 g. |
| Feed concentrations | {7.73 wt. percent Pu. {0.0582 wt. percent Am. |

| Time of gas bubbling, hr. | Fraction precipitated | |
|---|---|---|
| | Pu | Am |
| 1 | 0.931 | 0.033 |
| 2 | 0.989 | 0.041 |
| 3 | 0.999 | 0.556 |
| 5 | 1.00 | 0.917 |

Because of the simplicity and economics of this process, this method will have wide application in the recovery of reactor fuels. Therefore, it will be understood that this invention is not be limited to the details given herein, but that it may be modified within the scope of the appended claims.

What is claimed is:

1. A method of separating americium from plutonium in which both of these elements are contained in a molten salt solution, said method comprising the bubbling of a mixture of oxygen and argon gas into the said molten salt solution, precipitating the plutonium as plutonium dioxide and leaving in the said solution the americium, the said ratio of oxygen to argon gas being approximately 1 to 16 by volume and the period that the said mixture is bubbled is between 1 and 1½ hours.

2. The method of claim 1 in which the said mixture of gases is introduced for a period of 1½ hours.

References Cited
UNITED STATES PATENTS
3,154,379  10/1964  Benedict et al. _____ 23—325

BENJAMIN R. PADGETT, *Primary Examiner.*

M. J. McGREAL, *Assistant Examiner.*

U.S. Cl. X.R.
23—344, 343